(No Model.)
T. J. KIELEY.
REGISTERING STEAM TRAP.
No. 301,500. Patented July 8, 1884.
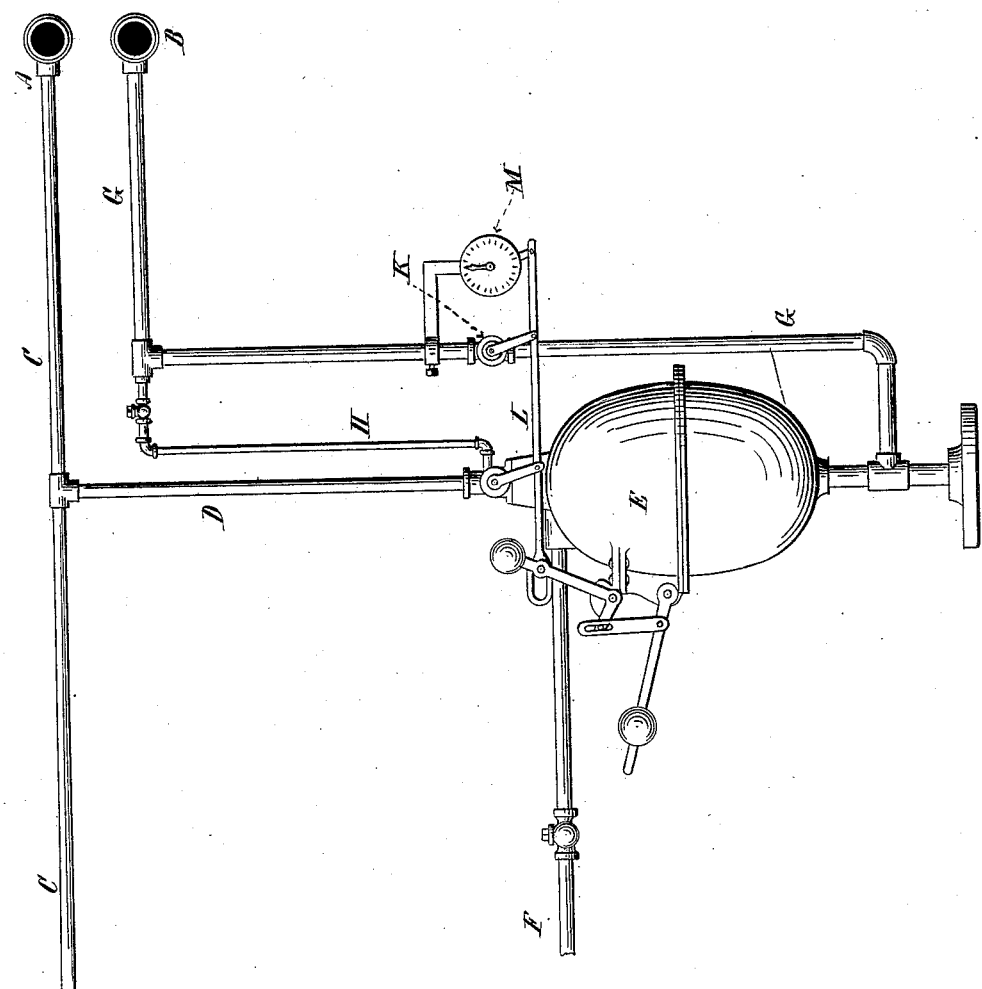
Witnesses:
J. Campbell
L. Sargeant
Inventor
Timothy J. Kieley
by his attorneys
Foster & Freeman

United States Patent Office.

TIMOTHY J. KIELEY, OF NEW YORK, N. Y.

REGISTERING STEAM-TRAP.

SPECIFICATION forming part of Letters Patent No. 301,500, dated July 8, 1884.

Application filed November 23, 1883. (No model.)

*To all whom it may concern:*

Be it known that I, TIMOTHY J. KIELEY, of the city, county, and State of New York, have invented a new and useful Improvement in Registering Steam-Traps, of which the following is a full, true, and exact description, reference being had to the accompanying drawing.

My invention relates to an improvement in steam-traps, especially those to be used in connection with a steam-heating system distributing steam through a city or town and delivering the same to individual houses for heating purposes. In these systems it is exceedingly desirable that the amount of steam condensed in a house should be accurately measured, while at the same time the water is automatically forced to return into the main return of the principal system. In such systems a trap is sometimes used to return the water of condensation, and it has been suggested that such traps can be used as meters to measure the return-water. The difficulty with this arrangement, however, is that as ordinarily constructed the trap does not in its operation always return the same amount of condensed water, varying greatly, and at times blowing through without measuring at all. If, for instance, the pressure in the street is great, while in the street-return it is small, and the system in the house is clear of water, under the arrangement as usually proposed the steam can blow straight through the system and into the return without operating the trap at all. By my combination this difficulty is prevented, and there can be no steam condensed in the heating system which is not measured in the condition of water by the trap.

My invention will be readily understood from the accompanying drawing, in which—

A represents the steam-main in the street; B, the return in the street; C, the steam-connection to the building; D, the direct steam-connection to the trap; E, the trap. This trap is preferably of the form patented to me on the 26th day of August, 1879, No. 218,885, though other forms might be employed, and is of the kind known as "automatic return steam-traps," the operation and principle of which are so well known as not to need detailed description.

F represents the return from the building; G, the discharge from the trap, communicating with the main-return B in the street. Into this return G may also be connected the exhaust-pipe H from the trap. This discharge-pipe G is likewise provided with a valve, K, operated directly through rod L from the float in the trap. Operated by the connecting-rod L is the register M, indicating the number of times the rod L has been operated.

In the ordinary operation of the trap, the condensed water entering the same will cause the float within it to rise until the tumble-bob has been thrown over, thereby moving the connecting-rod L to the left and opening the steam-valve in the pipe D, the result of which will be that the water in the trap E will be forced through the connection G into the return B, and, the trap being emptied, the float will sink until the tumble-bob is thrown to the right, thereby moving the connecting-rod L in the opposite direction, and thus shutting off the steam in the pipe D from the trap. When the trap is in this condition, however, there is ordinarily, and without my improvement, an open connection from pipe F to the pipe G, and to the return B through the check-valves of the system, and steam from the house discharge-pipe F might readily blow through the trap without being measured by it. I have therefore attached a cock, K, adapted to be turned by rod L, so that when the trap is emptied the pipe G shall be closed, and when the trap is full the cock K will open the communication through the pipe G. This cock, however, is not operated directly by the float in the trap E, but is operated through the connection caused to move by the fall of the tumble-bob, thereby giving an opportunity for the trap to fill and empty. By this means the trap is made a sure measure of all the steam delivered to the building.

What I claim as my invention, and desire to secure by Letters Patent, is—

1. The combination, with the return-trap, of a discharge-pipe from the building, a direct steam-pipe containing a valve, a discharge-pipe from the trap, containing a cock, and operating devices, substantially as described, the arrangement being such that when the direct steam is applied in the trap the cock in the discharge-pipe is automatically opened to allow the water to escape, and when the water is discharged the cock is automatically closed.

2. The combination, with a meter-trap, of the rod L, operating-cock K, and register M, substantially as described.

TIMOTHY J. KIELEY.

Witnesses:
ANTHONY GREF,
WILLIAM A. POLLOCK.